US012629235B1

(12) United States Patent
Almarshedy et al.

(10) Patent No.: US 12,629,235 B1
(45) Date of Patent: May 19, 2026

(54) MODIFIABLE LENGTH DENTAL IMPLANT SCREWDRIVER

(71) Applicant: KING SAUD UNIVERSITY, Riyadh (SA)

(72) Inventors: Samaher Mohammad Almarshedy, Riyadh (SA); Rawan Fahad Alsaif, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 19/400,382

(22) Filed: Nov. 25, 2025

(51) Int. Cl.
A61C 8/00 (2006.01)
(52) U.S. Cl.
CPC .................................. A61C 8/0089 (2013.01)
(58) Field of Classification Search
CPC ........................... A61C 8/0089; A61B 17/8894
See application file for complete search history.

(56) References Cited

U.S. PATENT DOCUMENTS

| | | | | | |
|---|---|---|---|---|---|
| 5,351,586 | A | * | 10/1994 | Habermehl | ............. B25B 27/04 |
| | | | | | 81/438 |
| 6,159,008 | A | * | 12/2000 | Kumar | ................. A61C 8/0087 |
| | | | | | 433/163 |
| 6,206,696 | B1 | * | 3/2001 | Day | ........................ A61C 8/008 |
| | | | | | 433/141 |
| 2011/0262883 | A1 | * | 10/2011 | Hung | ..................... A61C 8/006 |
| | | | | | 433/174 |
| 2015/0250565 | A1 | * | 9/2015 | Gustafsson | .......... A61C 8/0089 |
| | | | | | 433/165 |

OTHER PUBLICATIONS

MCTBIO-Mr.Curette (Mr.curette), "Orthodontic Screw Mini Set—SA(without hole) Type", YouTube Video, First available online Oct. 7, 2014. https://www.youtube.com/watch?v=rYqlSpZpx5c.
Dr Ahmad Salama Orthodontic illustrations, ep7. Orthodontic Miniscrew 2-Drivers design "with English subtitles", YouTube Video, First available online Apr. 10, 2021. https://www.youtube.com/watch?v=QjrzrZwKiDI.
Azdent, "Azdent Dental Universal Implant Torque Wrench Handpiece 2 Heads & 12 Drivers Kit", YouTube Video, First available online Dec. 9, 2022. https://www.youtube.com/watch?v=oYgyDQH2P0I.
DSI Dental Solutions, "DSI Electric Cordless Dental Implant Abutment Fixation Screw Driver with different torque options", YouTube Video, First available online Aug. 17, 2022. https://www.youtube.com/watch?v=skrlgOnlRm8.
AbutmentCompatibili.com, "Torque ratchet for implantology", YouTube Video, First available online Oct. 30, 2024. https://www.youtube.com/watch?v=WC93hw9oLCM.
Dr Craig Mallorie, "NSK iSD900 electronic implant prosthetics screwdriver review by Dr Craig Mallorie", YouTube Video, First available online Apr. 18, 2016. https://www.youtube.com/watch?v=Fc41kNI3a84.

(Continued)

*Primary Examiner* — Yogesh P Patel
(74) *Attorney, Agent, or Firm* — Nath, Goldberg & Meyer; Joshua B. Goldberg

(57) ABSTRACT

A tool for use in dental implants is provided. The tool is modifiable in length and employs an anti-extension lock and an anti-rotation key to ensure that any torque or rotational force imparted upon the handle of the tool transfers completely towards the distal end of the dental tool.

11 Claims, 6 Drawing Sheets

(56)  References Cited

OTHER PUBLICATIONS

Real World Tool Reviews, "Screwdriver innovation! Nobody does it better than Klein!", YouTube Video, First available online Oct. 25, 2022. https://www.youtube.com/watch?v=XtV1jfDoDfc.

Earth Ortho Private Limited, "screw driver for maxilofacial", YouTube Video, First available online Apr. 19, 2021. https://www.youtube.com/shorts/Sf7q2v6V460.

Dentmate Official, "New Screw Driver Sino Ortho", YouTube Video, First available online May 29, 2018. https://www.youtube.com/watch?v=QbftwdUz-E0.

Dr Craig Mallorie, "Salvin EasyReach Prosthetic wrench review by Dr Craig Mallorie", YouTube Video, First available online Apr. 17, 2016.

3D Company, "Easy Reach Right Angle Prosthetic Wrench", YouTube Video, First available online Mar. 30, 2015. https://www.youtube.com/watch?v=bcDPwOBixg8.

Allen Wu, "How to Use New Tool of Orthodontic Micro Screw", YouTube Video, First available online Aug. 21, 2019. https://www.youtube.com/watch?v=66RwYyH3gpl.

Nutlink Int'l Dental and Surgical Products Demo, "Dental Implants Screw Driver 6pcs | Dental Lab Technician Screw Driver | Implant Screw Kit Abutment", YouTube Video, First available online Dec. 29, 2021. https://www.youtube.com/watch?v=kU_rbpdvwls.

* cited by examiner

9

10

10

MODIFIABLE LENGTH DENTAL IMPLANT SCREWDRIVER

1. FIELD

The present disclosure relates to dental screwdrivers for use in dentistry for securing screw-fastened restorations and like-sized components.

2. BACKGROUND

Dental implants, or endosseous implants or fixtures, are surgical components that mate or attach with the bone of the jaw or skull to support a dental prosthetic such as a crown, bridge, denture, facial prosthetic, or to act as an orthodontic anchor. Dental implants undergo a biologic process of osseointegration where materials, such as titanium, bond to bone. As a result, a variable amount of healing time is required for osseointegration before the specific dental prosthetic is affixed to the implant. Alternatively, the waiting time can be eliminated, allowing the dental prosthetic to be attached to the implant before the occurrence of any osseointegration for aesthetic and/or functional reasons.

The risks and complications associated with implant therapy are generally divided into those that occur during surgery (such as excessive bleeding or nerve damage), those that occur within the first six months of surgery (such as infection and osseointegration failure), and those that occur in the long term (such as peri-implantitis and mechanical features or defects associated with the implant). In the presence of healthy tissues, a well-integrated implant with appropriate mechanical loads can optimally achieve long-term success rates of 93 to 98 percent for the specific fixture and anywhere from 10 to 15-year lifespans for the prosthetic teeth.

The securing of screw secured restorations is usually implemented using appropriately sized and fitted dental screwdrivers. Dental screwdrivers having non-bendable shafts are typically used with screw secured restorations. The tips to commercially available dental screwdrivers are sized to accommodate the design specifications from one or more specific implant vendors.

Dental screwdrivers and dental screwdriver tips come in a variety of sizes and shapes depending upon the specifications and screw head types called for by the restoration's manufacturer. Very often, different manufacturers intentionally size restorations to force dental practitioners to purchase a specific set of tools (including dental screwdrivers) which works in favor of the restoration manufacturer since dental practitioners are less likely to switch to a different manufacturer if doing so results in the need to acquire a whole new set of tools (including dental screwdrivers). However, over time, tools have been introduced with interchangeable heads and tips to address this problem.

Dental screwdrivers, which have various sizes and shapes depending upon their intended function and the respective implant component, are generally small enough that they can easily fit into the mouth of a patient. Dental screwdrivers usually have a shaft portion which may be standardized and allows the dental screwdriver to be connected to a dental handpiece or handle or may have a head adapted for use with a ratchet. However, due to varying size and shapes of the dental screwdrivers, it is generally very costly for a full size dental screwdriver (or adaptor, etc.) to be procured for each individual dental screwdriver as this leads to a greater number of instruments required to be kept on hand for a specific dental procedure, thus further complicating and slowing down the procedure for the dental practitioner.

Accordingly, what is needed is a dental screwdriver and/or component for a dental screwdriver that can retain a variety of different shaped heads or tips and can also provide for a modifiable length via an adjustment mechanism that allows the length of the dental screwdriver to be increased or decreased as needed in the particular dental procedure.

SUMMARY

In a first embodiment, the present subject matter relates to a dental tool used for securing a dental component, said dental tool comprising a handle by which said dental tool can be gripped by a user such as a dental practitioner and rotated by the dental practitioner in order to provide a rotational force to said dental component. The handle includes a mounting section at a distal end of the handle. The dental tool further comprises a shaft or extension tube connected to the handle at a distal end of the handle in the mounting section. A distal end of the shaft or extension tube (the end not connected to the handle) comprises a receptacle that facilitates interaction between the dental tool and the dental component to which the rotational force is imparted upon by the dental practitioner (either by being tightened or being loosened) via the dental tool. The shaft or extension tube can comprise or consist of a thick metal band with a pivot joint. Additionally, a retention element can reside within the mounting section of handle. Once located within the mounting section, a proximal end of the shaft or the extension tube can be securely held in place by the retention element in the mounting section of the handle such any torque imparted upon the handle by the dental practitioner is efficiently transferred to the head or tip of the dental tool and thus the dental component is loosened or tightened.

The dental tool may have the shape of or can be configured as a screwdriver or a handle driver. The handle, shaft or extension tube, and mounting section are preferably all aligned along a common central axis which defines the longitudinal direction of the dental tool. Thus, the handle and shaft or extension tube can extend along a straight line corresponding to the common central axis. In this regard of the one embodiment, the mounting section can be arranged at a distal end of the handle and can also extend along the longitudinal direction. Therefore, when in the mounted position, the retention element can also be aligned with the longitudinal axis of the dental tool. In certain embodiments, the retention element itself is a hollowed out, cylindrical shaped cavity, wherein the longitudinal axis of the hollowed out cylindrical shaped cavity of the retention element corresponds to the longitudinal axis of the head or tip of the dental tool.

As such, in one embodiment, the hollowed out cylindrical shaped cavity of the retention element of the mounting section can be arranged at the distal end of the handle. The hollowed out cylindrical shaped cavity of the retention element of the mounting section can be open at a most distal end surface of the handle. The distal end of the shaft or extension tube has a receptacle which defines an entrance hole such that a head or tip of the dental tool can be inserted into the receptacle of the shaft or extension tube in a longitudinal direction of the dental tool along a common axis. To put it another way, the handle can have a hollowed out cylindrical shaped cavity or opening arranged at the most distal end surface of the handle, which can be provided or configured for inserting the head or tip of the dental tool into the handle.

Additionally, in another embodiment, the pivot joint can have at least three side openings provided on the outer surface of the shaft or extension tube. In this regard, in certain embodiments, these side openings can be generally square in nature and can be aligned vertically along the outer surface of the shaft or extension tube parallel to the longitudinal direction of the dental tool. The at least three side openings of the pivot joint can each constitute a respective through-hole completely defined by the outer surface of the shaft or extension tube. The at least three side openings of the pivot joint can also be provided on the outer surface of the shaft or extension tube where the side openings of the pivot joint have a shape, i.e., generally square in nature, and can also be arranged along a circumferential direction of the shaft or extension tube.

As such, the distal end of the shaft or extension can include an annular portion which completely extends in a circumferential direction of the shaft or extension tube. An inner surface of this annular portion can abut the receptacle at the distal end of the shaft or extension tube. As such, the inner surface of the annular portion of the shaft or extension tube (which faces the inside of the cavity) can provide an interlocking engagement with an inserted portion of head or tip of the dental tool. Accordingly, the entrance hole for inserting the head or tip of the dental tool into the cavity can be separated from the plurality of side openings by the outer surface of the shaft or extension tube.

In an embodiment, the at least three side openings of the pivot joint can be provided on an outer surface of the shaft or extension tube adjacent to the distal end of the shaft or extension tube. Once the head or tip of the dental tool is inserted into the entrance hole of the receptacle, the dental practitioner can adjust or modify the length of the dental tool by retracting the shaft or extension tube such that one of the at least three side openings of the pivot joint provided on the outer surface of the shaft or extension tube lines up with a twist lock opening situated on a distal end of the handle and can be interlocked therewith. In this regard, the twist lock opening situated at the distal end of the handle can also include a generally square through-hole which, when in use, can be lined up by the dental practitioner to be aligned with a singular one of the three at least three side openings of the pivot joint such that both openings are kept in alignment with an anti-extension lock and such that an overall length of the dental tool is forced to remain at a fixed length.

The overall length of the dental tool is modifiable or adjustable to, for example, three lengths corresponding to the locations of the at least three side openings of the pivot joint, respectively, as provided on the outer surface of the shaft or extension tube by retracting or extending the shaft or extension tube such that the desired location of the one of at least three side openings of the pivot joint is aligned with the twist lock opening located at the distal end of the handle on an outer surface of the handle. These lengths can be modified as more or fewer side openings are included in the pivot joint. In one embodiment, the twist lock employed in this regard can be an internally spring-loaded lock that allows movement in one direction said direction being a radial direction oriented towards the longitudinal axis along the center of the dental tool. Movement in the opposite direction is prevented unless the lock is returned with a screwdriver and tool while the spring (not shown) is compressed. Other similar locking mechanisms are further contemplated herein.

These and other features of the present subject matter will become readily apparent upon further review of the following specification.

4

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
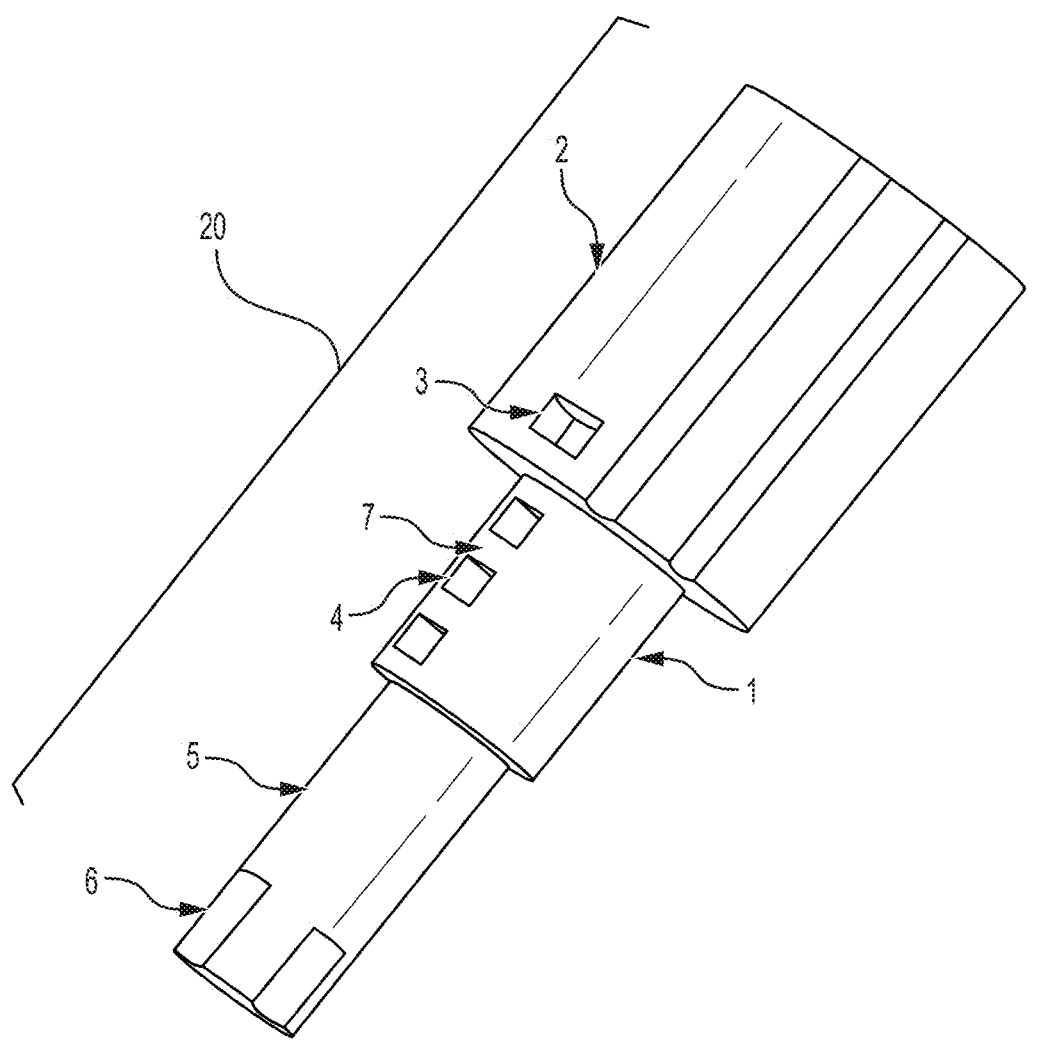
FIG. 1 is a first embodiment of the dental tool completely assembled.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, percentage ranges, length ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range.

Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

Figure 2:
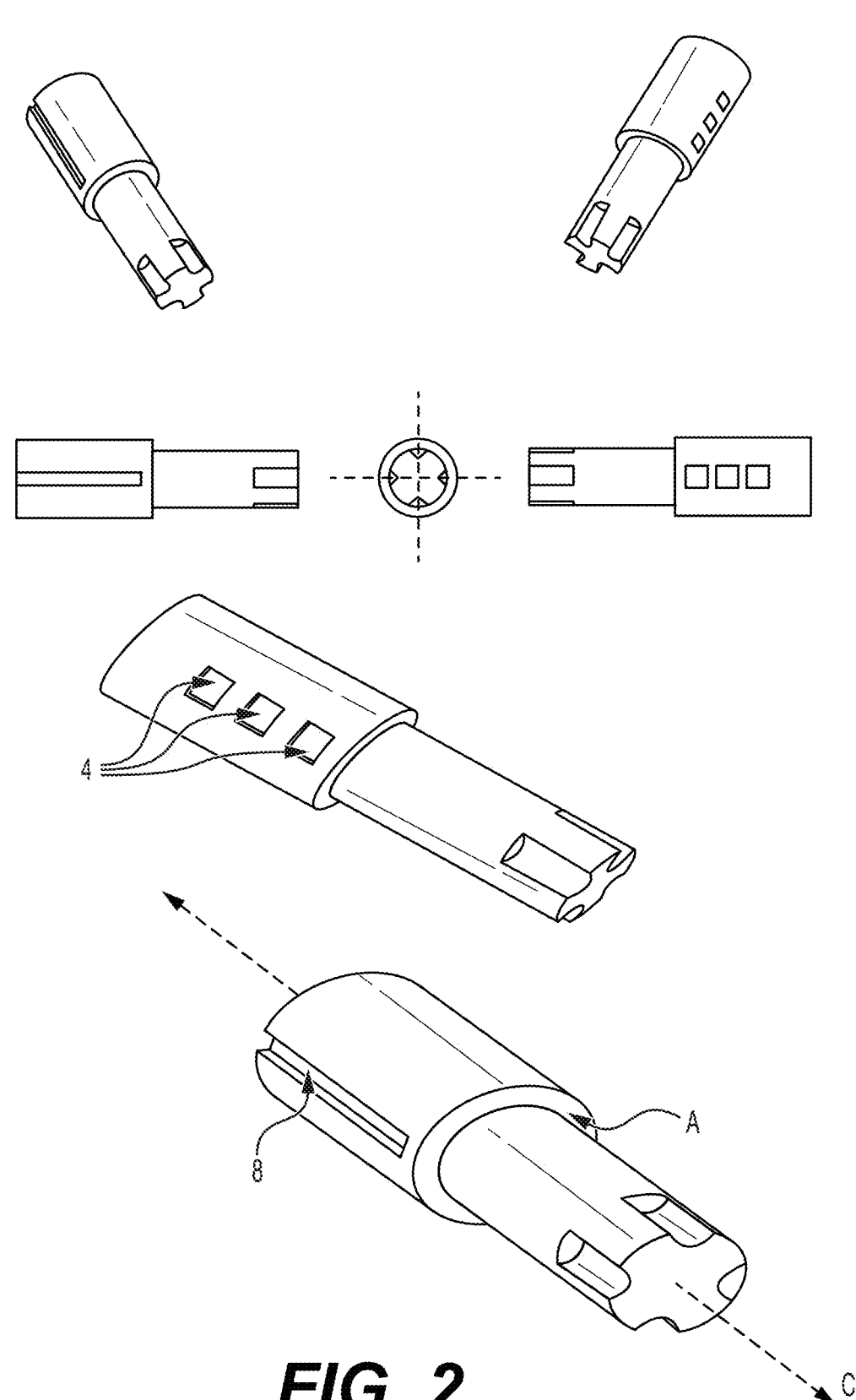
FIG. 2 is view of the shaft or extension tube being connected to the head or tip of the dental tool.
Figure 3:
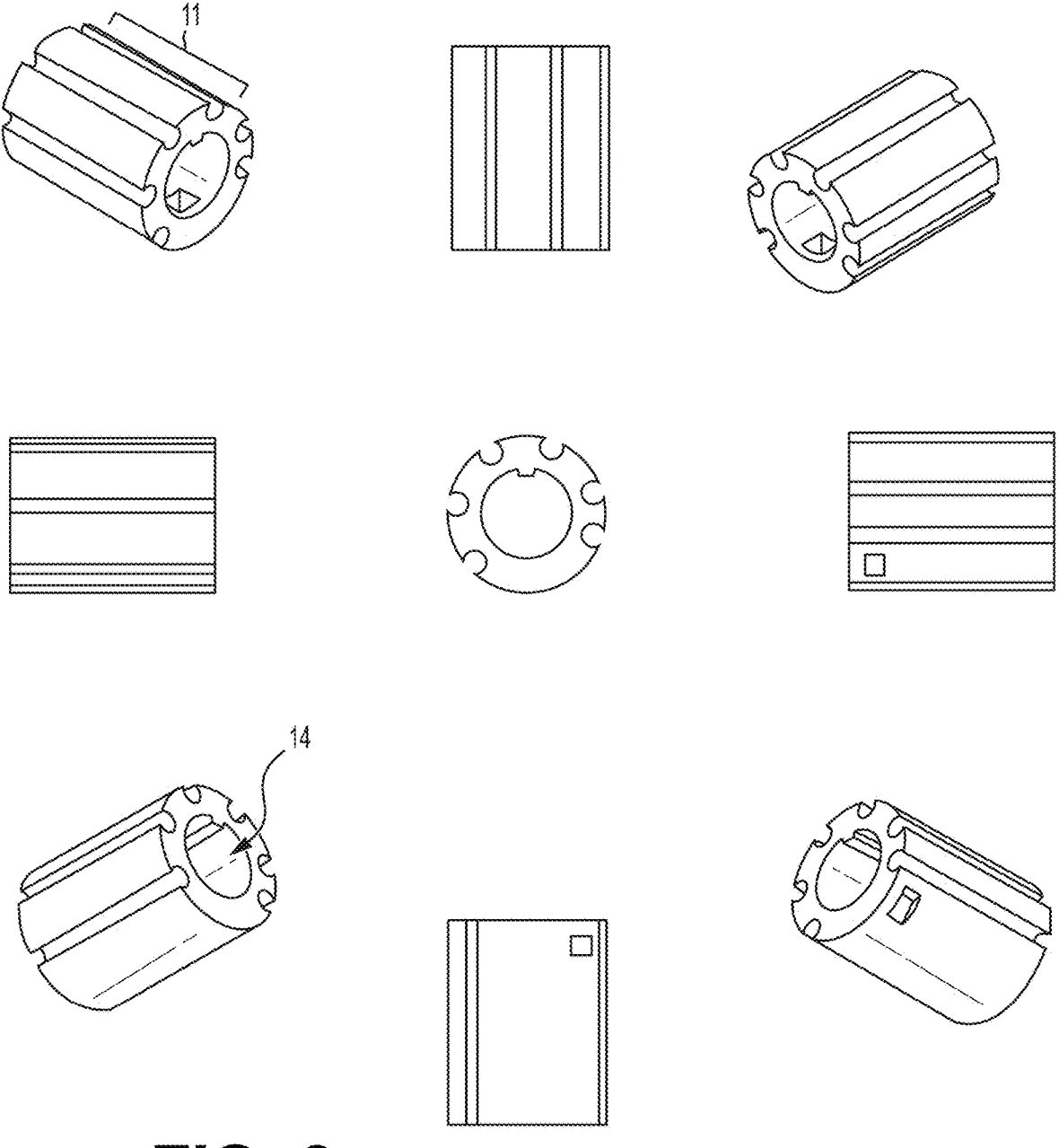
FIG. 3 provides an array of multiple views of the handle portion of the dental tool.
Figure 6:
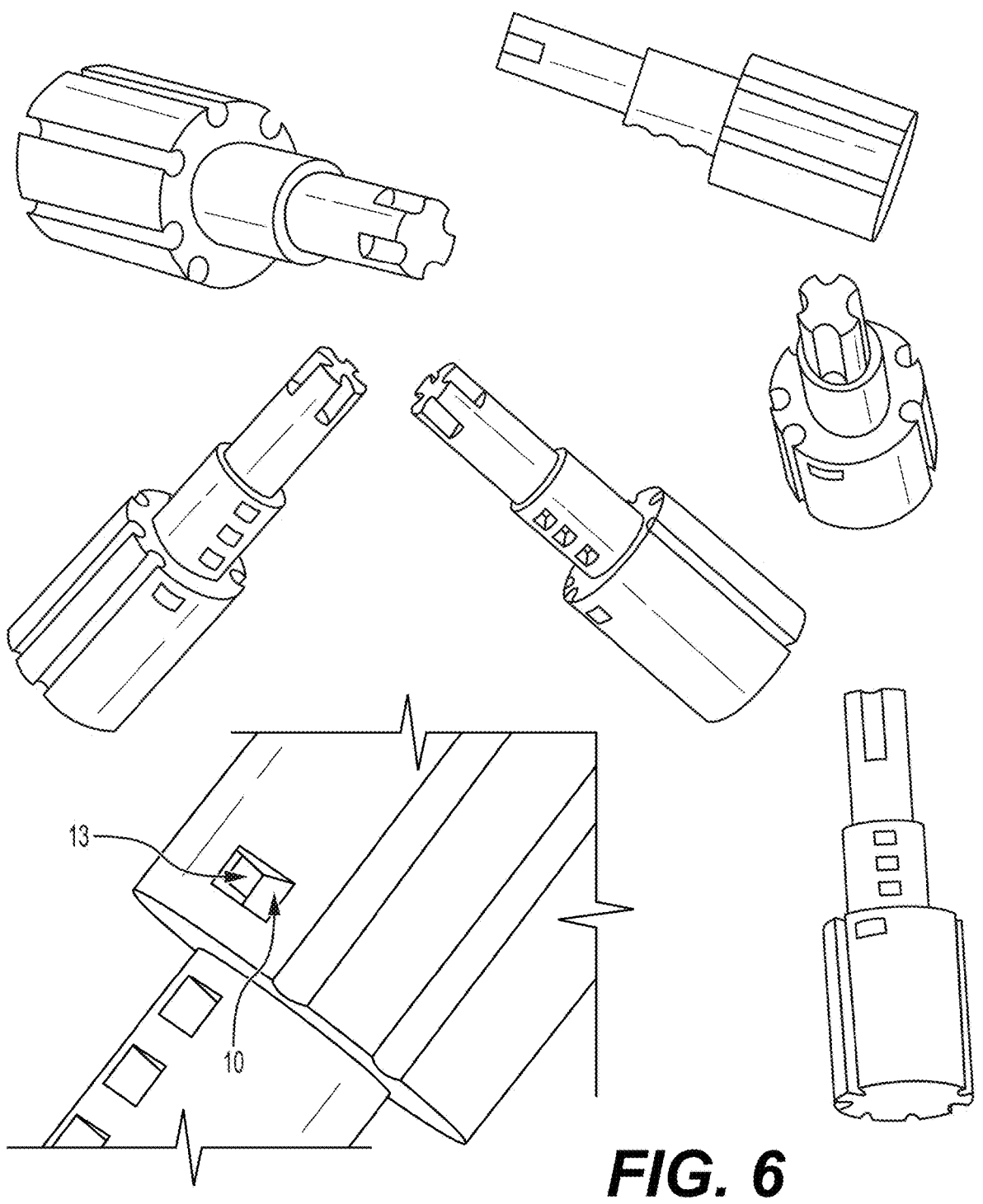
FIG. 6 shows an embodiment of the dental tool completely assembled with a close up of the twist lock opening.

In a first embodiment, as shown in FIGS. 1, 3, and 6, a dental tool (20) is used for securing a dental component such as an implant screw or other dental appliance fastening means to a seating surface inside the mouth of a patient. The dental tool includes a handle (2) by which said dental tool (20) can be gripped by a user, such as, but not limited to a dental practitioner, and rotated by the user in order to provide a rotational force to said dental component. The dental tool (20) further comprises a shaft or extension tube (1) connected to the handle (2) at a distal end of the handle (2), wherein a distal end of the handle (2) comprises a mounting section (11) that facilitates interaction between the dental tool (20) and the dental component to which the rotational force is imparted upon by the user (either by being tightened or being loosened) at the handle (2). The shaft or extension tube (1) consists of a thick metal band (7) with a pivot joint consisting of three apertures (4) where the thickness of the metal band 'A' is shown in FIG. 2. As shown in FIGS. 1, 3-4, and 6, a retention element (14) resides within the mounting section (11) of the handle (2) where the retention element (14) is adapted to securely hold a proximal end of the shaft or extension tube (1). A shaft (5) of the head or tip (6) of the dental tool (20) is received by the receptacle at a distal end of the shaft or extension tube (1) allowing any torque imparted upon the shaft or extension tube (1) by the dental practitioner from a twisting of the connected handle (2) to be transferred to the head or tip (6) of the dental tool (20) and such that the dental component is loosened or tightened.

The dental tool (20) may have the shape of or can be configured as a screwdriver or handle driver as shown in FIGS. 1, 3-4, 6. The handle (2), shaft or extension tube (1), and mounting section (14) are preferably along a common central axis 'C' which defines the longitudinal direction of the dental tool (20) as shown in FIG. 3. Thus, the handle (2) and shaft or extension tube (1) extend along a straight line, wherein preferably the mounting section (11) is arranged in a distal end of the handle (2) and also extends along the longitudinal direction of the dental tool (20). Therefore, in the mounted position of the retention element (14), the retention element (14) is also aligned with the longitudinal axis of the dental tool (20). The retention element (14) itself is basically a hollowed out cylindrical shaped cavity at the distal end of the handle (2), wherein the longitudinal axis of the hollowed out cylindrical shaped cavity of the retention element (14) corresponds to the longitudinal axis of shaft or extension tube (1) as shown in FIG. 2.

Figure 4:
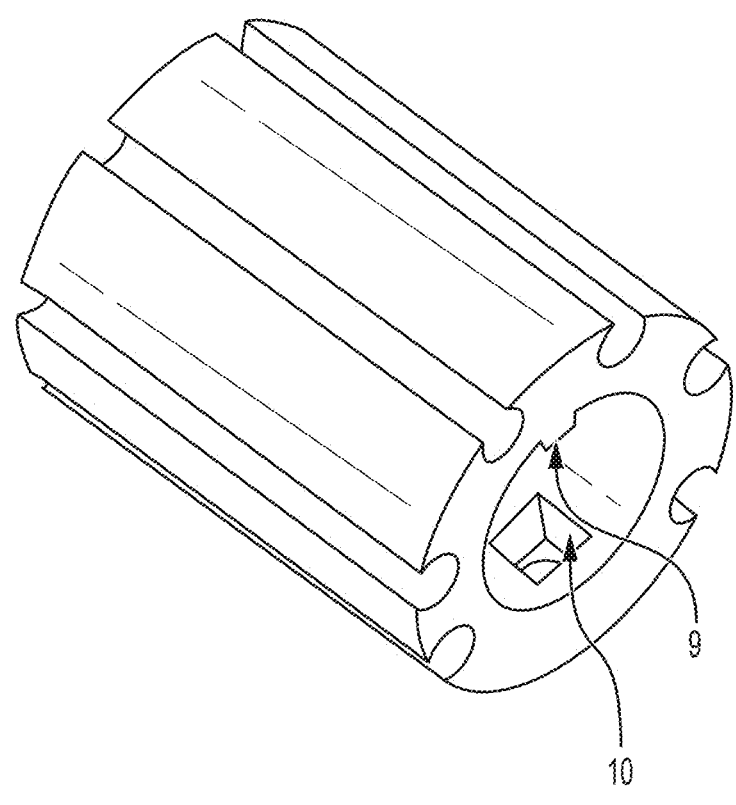
FIG. 4 provides a close up ¾ view of the handle portion of the dental tool.
Figure 4:
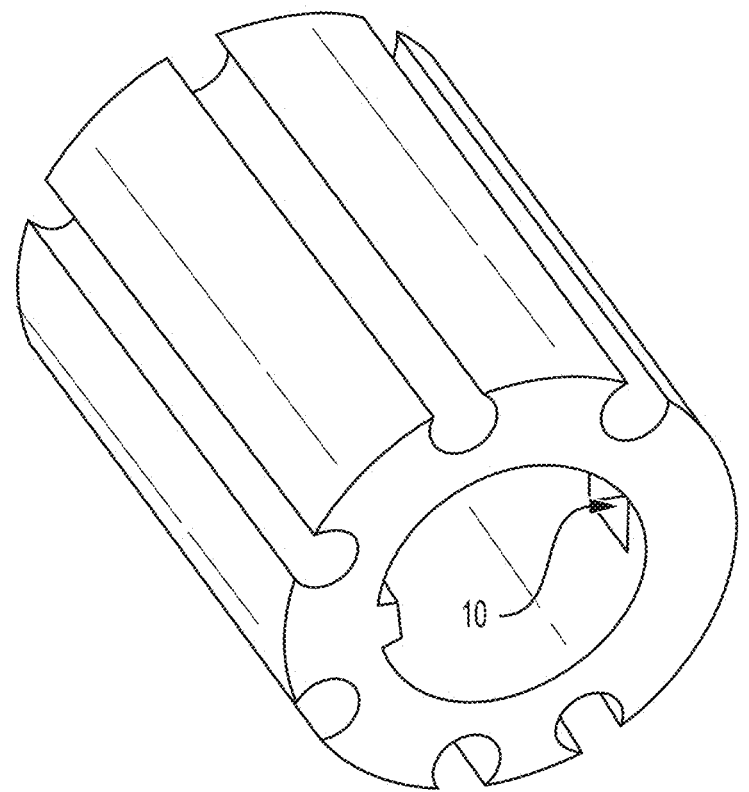

As shown in FIGS. 1 and 3-4, the hollowed out cylindrical shaped cavity of the retention element (14) of the mounting section (11) is arranged at the distal end of handle (2). The hollowed out cylindrical shaped cavity of the retention element (11) of the mounting section (14) is open to the distal end of the handle (2) and defines an entrance hole such that the shaft or extension tube (1) of the dental tool (20) can be inserted into the mounting section (14) of the handle (2) along the longitudinal direction of the dental tool (20). To put it another way, the handle (2) has a hollowed out cylindrical shaped cavity or opening arranged at the distal end surface of the handle (2) which is provided for inserting a proximal end of the shaft or extension tube (1). The shaft or extension tube (1) has a receptacle of its own at a distal end of the shaft or extension tube (1) such that a shaft (5) of the head or tip (6) of the dental tool (20) can be inserted into the receptacle at the distal end of the shaft or extension tube (1).

Additionally in the first embodiment as shown in FIGS. 1 & 6, the at least three side openings of the pivot joint (4) are provided on the outer surface of the shaft or extension tube (1). In one embodiment, the side openings of the pivot joint (4) can be generally square in nature and can be aligned vertically along the outer surface of the shaft or extension tube (1) parallel to the longitudinal direction of the dental tool (20). The side openings of the pivot joint (4) can be any suitable size or shape consistent with the other components of the dental tool (20). The at least three side openings of the pivot joint (4) each constitute a respective through-hole which can be completely defined by the outer surface of the shaft or extension tube (1). In another embodiment, the at least three side openings of the pivot joint (4) can also be arranged along a circumferential direction of the shaft or extension tube (1).

FIGS. 1-2 show the most distal end of the shaft or extension tube (1) exhibiting an annular portion with a thickness of 'A' which completely extends in a circumferential direction of the shaft or extension tube (1). In FIGS. 3-4, an inner surface of the hollowed out cylindrical shaped cavity of the retention element (14) of the mounting section (11) arranged at the distal end of the handle (2). As such, the inner surface of the handle (2) which faces the inside of the cavity exhibits a surface which provides an interlocking engagement with an inserted portion of the shaft or extension tube (1) of the dental tool (20). Additionally, Accordingly, an entrance hole in the receptacle at the distal end of the shaft or extension tube (1) for inserting the head or tip (6) of the dental tool (20) is separated from the plurality of side openings of the pivot joint (4) by the outer surface of the shaft or extension tube (1).

Figure 5:
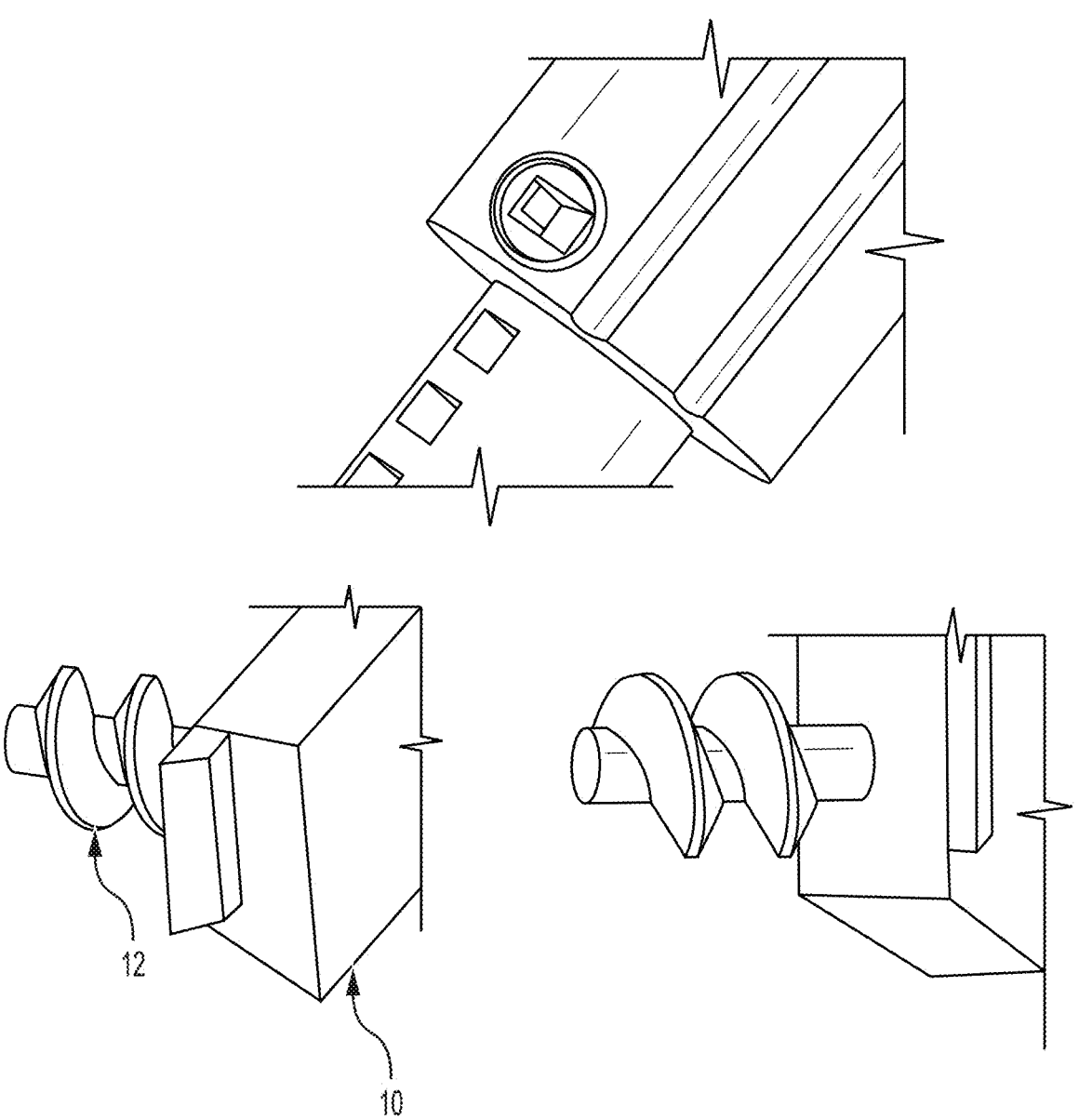
FIG. 5 is a view of the anti-extension lock and the twist lock opening into which the anti-extension lock is inserted.

In the first embodiment as shown in FIGS. 1 and 6, the at least three side openings of the pivot joint (4) are provided on an outer surface of the shaft or extension tube (1) adjacent the distal end of the shaft or extension tube (1) and once the head or tip (6) of the dental tool (20) is inserted into the entrance hole of the receptacle at the distal end of the shaft or extension tube (1), the dental practitioner can adjust or modify the length of the dental tool (20) by retracting the shaft or extension tube (1) such that one of the at least three side openings of the pivot joint (4) provided on the outer surface of the shaft or extension tube (1) lines up with a twist lock opening (3) situated on a distal end of the handle (2). As shown in FIGS. 1, 3, and 6, the twist lock opening (3) situated at the distal end of the handle (2) is also generally a square through-hole (3) which when in use is lined up by the dental practitioner to be aligned with a singular one of the at least three side openings of the pivot joint (4) such that both openings are kept in alignment with an anti-extension lock (10) as shown in FIGS. 4-6 such that an overall length of the dental tool (20) is forced to remain at a fixed length.

The overall length of the dental tool (20) is modifiable or adjustable to three lengths corresponding to the locations of the at least three side openings of the pivot joint (4), respectively, as provided on the outer surface of the shaft or extension tube (1) by retracting or extending the shaft or extension tube (1) such that the desired location of the one of at least three side openings of the pivot joint (4) is aligned with the twist lock opening (3) located at the distal end of the handle (2) on an outer surface of the handle. As shown in FIGS. 5-6, the twist lock (10) is a spring-loaded lock that allows movement in one direction said direction being a radial direction oriented towards the longitudinal axis along the center of the dental tool (20). The twist lock (10) includes a screw (12) which enters both the aligned one of at least three side openings of the pivot joint (4) and the twist lock opening (3) to lock the dental tool (20) in place. Movement in the opposite direction is prevented unless the twist lock (10) is returned with a screwdriver and tool against a tab (13) while the screw (12) slides downward due to an internal spring (not shown) being compressed. In order to shorten the dental tool, the tab (13) is moved to the left which causes the internal spring to be compressed and allows the screw (12) to slide downward from the twist lock opening (3) and the one side opening of the pivot joint (4) to arrive at a desired length.

In this first embodiment as shown in FIGS. 1, 2, 4, and 6, the shaft or extension tube (1) includes a rectangular channel (8) which serves as a path for the anti-rotation key (9) located at a distal end of the handle (2) such that when inserted into the handle (2), the shaft or extension tube (1) is prevented from rotating about the longitudinal central axis of the dental tool (20) by the anti-rotation key (9) of the handle (2). The anti-rotation key (9) is shown to protrude radially as a raised square or rectangle inward towards the central longitudinal axis of the shaft or extension tube (1). Accordingly, with this arrangement of the anti-rotation key (9) of the handle (2) being securely lodged within the rectangular channel (8) of the shaft or extension tube (1), any torque or rotational force applied by the dental practitioner is transferred efficiently to the head or tip (6) of the dental tool (20). This point of contact along with the arrangement of the twist lock (10) at a fixed length as discussed above ensures that the tool can effectively transfer any motive force from the handle (2) to the head or tip (5) of the dental tool (20). The twist lock (12) prevents any upward movement (i.e., any movement towards the proximal end of the handle (2)). However, when any upward movement is required, the protrusion of the anti-rotation key (9) is gently moved backwards towards the distal end of the dental tool (20) with the assistance of the rectangular channel (8) allowing the dental tool (20) to extend back to its original length.

It is to be understood that the dental tool is not limited to the specific embodiment described above, but encompasses any and all embodiments within the scope of the generic language of the following claims enabled by the embodiment described herein, or otherwise shown in the drawings or described above in terms sufficient to enable one of ordinary skill in the art to make and use the claimed subject matter.

We claim:

1. A dental tool for use in dental implant treatments, the dental tool comprising:
a handle having a proximal end and a distal end, wherein the handle comprises a mounting section located at the distal end of the handle;
a shaft or extension tube having a proximal end and a distal end, wherein the shaft or extension tube has a receptacle at the distal end of the shaft or extension tube and at least three side openings of a pivot joint at a distal end of the shaft or extension tube;
the mounting section comprising a cavity and one side opening;
wherein the cavity is present at the distal end of the handle and extends from a most distal end surface of the handle into and through the handle such that the handle is hollow for at least a portion of the way through the handle,
wherein the receptacle at the distal end of the shaft or extension tube receives a shaft of a tip or a head of the dental tool, and
wherein the at least three side openings of the pivot joint are formed in an outer surface of the shaft or extension tube as through-holes;
a retention element held inside the mounting section of the handle for holding a proximal end of the shaft or extension tube;
an anti-extension lock; and
an anti-rotation key.

2. The dental tool for use in dental implant treatments as recited in claim 1, wherein the handle further comprises an opening at the distal end of the handle for a twist lock.

3. The dental tool for use in dental implant treatments as recited in claim 2, wherein the shaft or extension tube comprises a rectangular channel which serves as a path for the anti-rotation key.

4. The dental tool for use in dental implant treatments as recited in claim 3, wherein the anti-rotation key prevents rotation between the shaft or extension tube and the handle.

5. The dental tool for use in dental implant treatments as recited in claim 4, wherein the anti-rotation key comprises an inner surface of the handle having a protrusion that slides into and engages the rectangular channel of the shaft or extension tube when the shaft or extension tube is inserted into the handle.

6. The dental tool for use in dental implant treatments as recited in claim 5, wherein the anti-extension lock comprises a spring loaded lock which when inserted into the twist lock opening allows movement in one direction but prevents movement in another direction.

7. The dental tool for use in dental implant treatments as recited in claim 6, wherein the one direction is towards the proximal end of the handle.

8. The dental tool for use in dental implant treatments as recited in claim 7, wherein the dental tool can be adjusted to move in the another direction by moving the protrusion on the inner surface of the handle through the rectangular channel of the shaft or extension tube allowing the dental tool to extend back to an original length.

9. The dental tool for use in dental implant treatments as recited in claim 8, wherein the another direction is towards the distal end of the head or tip.

10. The dental tool for use in dental implant treatments as recited in claim 2, wherein the at least three side openings of the pivot joint are provided on an outer surface of the shaft or extension tube, wherein the at least three side openings of the pivot joint are square in nature and are aligned vertically along the outer surface of the shaft or extension tube parallel to a longitudinal direction of the dental tool, and wherein a length of the dental tool is modifiable by aligning a one of the at least three side openings of the pivot joint with the twist lock opening and securing said aligning with the anti-extension lock.

11. The dental tool for use in dental implant treatments as recited in claim 10, wherein the at least three side openings of the pivot joint each constitute a respective square through-hole which is completely defined by the outer surface of the shaft or extension tube, and wherein the at least three side openings of the pivot joint are also provided on the outer surface of the shaft or extension tube and are arranged along a circumferential direction of the shaft or extension tube.

\*    \*    \*    \*    \*